United States Patent
Moriyama et al.

(10) Patent No.: US 10,822,474 B2
(45) Date of Patent: Nov. 3, 2020

(54) RESIN COMPOSITION AND RESIN MOLDED BODY

(71) Applicant: FUJI XEROX CO., LTD., Tokyo (JP)

(72) Inventors: Masahiro Moriyama, Minamiashigara (JP); Kenji Yao, Minamiashigara (JP)

(73) Assignee: FUJI XEROX CO., LTD., Tokyo (JP)

( * ) Notice: Subject to any disclaimer, the term of this patent is extended or adjusted under 35 U.S.C. 154(b) by 6 days.

(21) Appl. No.: 16/256,036

(22) Filed: Jan. 24, 2019

(65) Prior Publication Data

US 2019/0169403 A1 Jun. 6, 2019

Related U.S. Application Data

(63) Continuation of application No. PCT/JP2017/014866, filed on Apr. 11, 2017.

(30) Foreign Application Priority Data

Dec. 20, 2016 (JP) .................. 2016-247142

(51) Int. Cl.
| | |
|---|---|
| *C08L 1/12* | (2006.01) |
| *C08L 33/08* | (2006.01) |
| *C08L 33/10* | (2006.01) |
| *B29C 45/00* | (2006.01) |
| *C08K 5/11* | (2006.01) |
| *C08L 33/06* | (2006.01) |
| *C08J 5/00* | (2006.01) |
| *C08K 5/00* | (2006.01) |
| *B29K 233/04* | (2006.01) |
| *B29K 1/00* | (2006.01) |

(52) U.S. Cl.
CPC ............ *C08L 1/12* (2013.01); *B29C 45/0001* (2013.01); *C08J 5/00* (2013.01); *C08K 5/00* (2013.01); *C08K 5/11* (2013.01); *C08L 33/06* (2013.01); *C08L 33/08* (2013.01); *C08L 33/10* (2013.01); *B29K 2001/12* (2013.01); *B29K 2233/08* (2013.01); *B29K 2233/12* (2013.01)

(58) Field of Classification Search
CPC .... C08J 5/00; C08K 5/00; C08L 23/06; C08L 1/12; C08L 33/08; C08L 33/10; C08L 33/06; B29C 45/0001; B29K 2233/12; B29K 2001/12; B29K 2233/08
See application file for complete search history.

(56) References Cited

U.S. PATENT DOCUMENTS

| | | |
|---|---|---|
| 2007/0179236 A1 | 8/2007 | Landon |
| 2016/0090473 A1* | 3/2016 | Yao et al. .............. C08L 1/10 524/40 |
| 2016/0280892 A1 | 9/2016 | Yao et al. |

FOREIGN PATENT DOCUMENTS

| | | |
|---|---|---|
| CN | 101410339 A | 4/2009 |
| CN | 106009049 A | 10/2016 |
| JP | 2015-168708 A | 9/2015 |
| JP | 2015-168709 A | 9/2015 |
| JP | 2016-124883 A | 7/2016 |

OTHER PUBLICATIONS

Jul. 11, 2017 International Search Report isssued in International Patent Application No. PCT/JP2017/014866.
Jul. 11, 2017 Written Opinion of the International Searching Authority issued in International Patent Application No. PCT/JP2017/014866.
Sep. 1, 2020 Office Action issued in Japanese Patent Application No. 2016-247142.
Aug. 25, 2020 Office Action issued in Chinese Patent Application No. 201780054336.8.

\* cited by examiner

*Primary Examiner* — Nathan M Nutter
(74) *Attorney, Agent, or Firm* — Oliff PLC

(57) ABSTRACT

Provided is a resin composition containing: a cellulose acetate in which the weight average polymerization degree is 120-330 and the degree of substitution of an acetyl group is 2.10-2.60; a (meth)acrylic polymer having a weight average molecular weight of 1000-30000; and a plasticizer.

17 Claims, No Drawings

RESIN COMPOSITION AND RESIN MOLDED BODY

CROSS-REFERENCE TO RELATED APPLICATIONS

This is a continuation of International Application No. PCT/JP2017/014866 filed on Apr. 11, 2017 and claims priority from Japanese Patent Application No. 2016-247142 filed on Dec. 20, 2016.

BACKGROUND

Technical Field

The present invention relates to a resin composition and a resin molded body.

Related Art

The cellulose ester is generally a resin obtained by esterification of plant-derived cellulose with a carboxylic acid. The resin composition containing the cellulose ester is used for molding of various parts, housings and the like of electronic and electrical appliance, office equipment, home appliances, and vehicles and the like.

For example, Patent Literature 1 discloses a cellulose ester composition containing 2 to 100 parts by mass of a plasticizer and 1 to 10 parts by mass of a methyl methacrylate unit-containing polymer having a weight average molecular weight of 5000 to 30000 with respect to 100 parts by mass of a cellulose ester.

CITATION LIST

Patent Literature

Patent Literature 1: JPA2015-168708

SUMMARY

Aspects of non-limiting embodiments of the present disclosure relate to provide a resin composition comprising cellulose acetate, a (meth)acrylic polymer and a plasticizer, which is excellent in thermal fluidity compared with the case where the weight average polymerization degree of cellulose acetate is more than 330, the degree of acetyl group substitution of cellulose acetate is more than 2.60, or the weight average molecular weight of the (meth)acrylic polymer is more than 30,000.

Aspects of certain non-limiting embodiments of the present disclosure address the features discussed above and/or other features not described above. However, aspects of the non-limiting embodiments are not required to address the above features, and aspects of the non-limiting embodiments of the present disclosure may not address features described above.

According to an aspect of the present disclosure, there is provided a resin component containing: a cellulose acetate having a weight average polymerization degree of from 120 to 330 and an acetyl group substitution degree of from 2.10 to 2.60; (meth) acrylic polymer having a weight average molecular weight of from 1000 to 30000; and a plasticizer.

DETAILED DESCRIPTION

Exemplary embodiments of the present invention will be described below. These descriptions and examples illustrate exemplary embodiments and do not limit the scope of the invention. The mechanism of action described herein includes an estimate, and its correctness does not limit the scope of the invention.

In the present disclosure, when referring to the amount of each component in the composition, in a case where plural types of substances corresponding to each component are present in the composition, unless otherwise specified, the amount of each component means the total amount of the plural types of substances present in the composition.

In the present disclosure, "(meth)acrylic" means that it may be either "acrylic" or "methacrylic".

<Resin Composition>

The resin composition according to the exemplary embodiment contains: a cellulose acetate having a weight average polymerization degree of 120 or more and 330 or less and an acetyl group substitution degree of 2.10 or more and 2.60 or less; (meth)acrylic polymer having a weight average molecular weight of 1000 or more and 30000 or less; and a plasticizer. In the present specification, the "(meth)acrylic polymer having a weight average molecular weight of 1000 or more and 30000 or less" is also referred to as "low molecular weight (meth)acrylic polymer".

Since cellulose acetate has poor thermal fluidity due to the intramolecular and intermolecular hydrogen bond working, in order to subject a resin composition to a molding method (for example, injection molding) in which the resin composition is thermally flowed and molded, conventionally, a plasticizer is added to increase the thermal fluidity. However, since plasticizers (eg, adipic acid esters, polyether esters, etc.) sometimes precipitate (bleed out) in the resin molded body, from the viewpoint of suppressing precipitation, the smaller the addition amount of the plasticizer is, the better.

The present inventors have found that when a low molecular weight (meth)acrylic polymer is added to a cellulose acetate having a weight average polymerization degree of 120 or more and 330 or less and an acetyl group substitution degree of 2.10 or more and 2.60 or less in addition to a plasticizer, the thermal fluidity is further improved. It is presumed that the low molecular weight (meth)acrylic polymer enters between the cellulose acetate molecules and attenuates the hydrogen bonding force between the cellulose acetate molecules, and as a result, the thermal fluidity of the resin composition is further improved. In contrast, it is presumed that the (meth)acrylic polymer having a weight-average molecular weight of more than 30,000 hardly enters between molecules of cellulose acetate and hardly exhibits the action of attenuating the hydrogen bonding force between cellulose acetate molecules. In addition, for cellulose acetate having a weight average polymerization degree of more than 330 and cellulose acetate having an acetyl group substitution degree of more than 2.60 or less than 2.10, a low molecular weight (meth)acrylic polymer hardly enters between the cellulose acetate molecules and the hydrogen bonding force between the cellulose acetate molecules is not attenuated so much, and thereby it is presumed that improvement in thermal fluidity is small. In the exemplary embodiment, the weight average polymerization degree of cellulose acetate is 120 or more and the degree of acetyl group substitution is 2.10 or more from the viewpoint of ensuring the rigidity required for the resin molded body.

Since the resin composition according to the exemplary embodiment contains a low molecular weight (meth)acrylic polymer together with a plasticizer, higher thermal fluidity is exhibited, so that the addition amount of the plasticizer conventionally added to cellulose acetate may be reduced. Thereby, precipitation (bleed-out) of the plasticizer in the resin molded body is suppressed.

Hereinafter, the materials, compositions, and manufacturing methods of the resin composition according to the exemplary embodiment will be described in detail.

[Cellulose Acetate]

Cellulose acetate has a structure in which at least a part of the hydroxyl group of cellulose is substituted with an acetyl group by esterification of cellulose with acetic acid. In the resin composition according to the exemplary embodiment, the acetyl group substitution degree of cellulose acetate is 2.10 or more and 2.60 or less, more preferably 2.15 or more and 2.50 or less, and still more preferably 2.15 or more and 2.45 or less.

In the resin composition according to the exemplary embodiment, the weight average polymerization degree of cellulose acetate is 120 or more and 330 or less, more preferably 125 or more and 320 or less, and still more preferably 130 or more and 300 or less.

The resin composition according to the exemplary embodiment preferably contains cellulose acetate as a main component. The main component of the resin composition is a chemical substance that accounts for 50% by mass or more of the entire resin composition. The proportion of cellulose acetate in the entire resin composition according to the exemplary embodiment is preferably 50% by mass or more, more preferably 60% by mass or more.

[Low Molecular Weight (Meth)Acrylic Polymer]

The low molecular weight (meth)acrylic polymer is a polymer of a (meth)acrylic acid ester. Monomers other than the (meth)acrylic acid ester may be copolymerized in the low molecular weight (meth)acrylic polymer in a range of from 0 mol % to 80 mol % (desirably in a range of from 0 mol % to 50 mol %). Here, "0 mol %" means that no other monomer is copolymerized.

Examples of the (meth)acrylic acid ester, which is a polymerization component of the low molecular weight (meth)acrylic polymer, include methyl (meth)acrylate, ethyl (meth)acrylate, n-propyl (meth)acrylate, isopropyl (meth) acrylate, n-butyl (meth)acrylate, isobutyl (meth)acrylate, s-butyl (meth)acrylate, t-butyl (meth)acrylate, cyclohexyl (meth)acrylate, 2-ethylhexyl (meth)acrylate, and dodecyl (meth)acrylate. A (meth)acrylic acid alkyl ester having an alkyl group having 1 to 12 carbon atoms is preferable.

Examples of monomers which may be used as the polymerization component of the low molecular weight (meth) acrylic polymer, other than the (meth)acrylic acid ester, include (meth)acrylic acid, styrene, 2-methoxyethyl (meth) acrylate, glycidyl (meth)acrylate and the like.

One exemplary embodiment of the low molecular weight (meth)acrylic polymer includes poly (methyl methacrylate) (PMMA).

The weight average molecular weight of the low molecular weight (meth)acrylic polymer is from 1,000 to 30,000, more preferably from 1,000 to less than 14,000, still more preferably from 1,000 to 10,000, and still further preferably from 1,000 to 4,000.

From the viewpoint of enhancing thermal fluidity, the resin composition according to the exemplary embodiment preferably contains, with respect to 100 parts by mass of cellulose acetate, 2 parts by mass or more of low molecular weight (meth)acrylic polymer, more preferably 3 parts by mass or more, still more preferably 5 parts by mass or more.

On the other hand, from the viewpoint of enhancing the rigidity of the molded body, it is preferable that the content of the low molecular weight (meth)acrylic polymer in the resin composition according to the exemplary embodiment is small. The content of the low molecular weight (meth) acrylic polymer in the resin composition according to the exemplary embodiment is preferably 15 parts by mass or less, more preferably 12 parts by mass or less, and still more preferably 10 parts by mass or less with respect to 100 parts by mass of cellulose acetate.

[Plasticizer]

The resin composition according to the exemplary embodiment contains a plasticizer in addition to the low molecular weight (meth)acrylic polymer.

Examples of the plasticizer include adipic acid esters, polyether esters, sebacic acid esters, glycol esters, acetic acid esters, dibasic acid esters, phosphoric acid esters, phthalic acid esters, citric acid esters, stearic acid esters, metal soaps, camphor, polyols, polyalkylene oxides, and the like. These plasticizers may be used alone, or two or more types of them may be used in combination.

From the viewpoint of enhancing the thermal fluidity, it is preferable that the resin composition according to the exemplary embodiment contains, in addition to the low molecular weight (meth)acrylic polymer, 5 parts by mass or more of a plasticizer, more preferably 8 parts by mass or more of a plasticizer, still more preferably 10 parts by mass or more of a plasticizer, with respect to 100 parts by mass of cellulose acetate.

On the other hand, from the viewpoint of suppressing precipitation (bleed-out) of the plasticizer in the molded body, it is preferable that the content of the plasticizer in the resin composition according to the exemplary embodiment is small. The content of the plasticizer in the resin composition according to the exemplary embodiment is preferably 20 parts by mass or less, more preferably 18 parts by mass or less, and still more preferably 15 parts by mass or less based on 100 parts by mass of cellulose acetate.

From the viewpoint of achieving good thermal fluidity, rigidity of the molded body, and suppression of bleeding out of the plasticizer in the molded body in a well-balanced manner, the resin composition according to the exemplary embodiment preferably has a low molecular weight (meth) acrylic polymer in an amount of 2 parts by mass or more and 15 parts by mass or less and a plasticizer other than the low molecular weight (meth)acrylic polymer in an amount of 5 parts by mass or more and 20 parts by mass or less.

—Adipic Acid Ester—

The resin composition according to the exemplary embodiment preferably contains adipic acid ester as a plasticizer. Examples of the adipic acid ester include adipic acid diester and adipic acid polyester. Specific examples thereof include adipic acid diester represented by the following general formula (2-1) and adipic acid polyester represented by the following general formula (2-2).

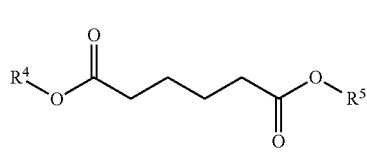

General formula (2-1)

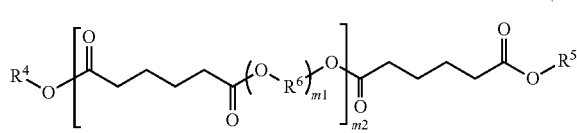

General formula (2-2)

In the general formulae (2-1) and (2-2), $R^4$ and $R^5$ independently represent an alkyl group or a polyoxyalkyl group $[-(C_xH_{2x}-O)_y-R^{41}]$. $R^{41}$ represents an alkyl group, x represents an integer of 1 or more and 10 or less, and y represents an integer of 1 to 10. In the general formula (2-2), $R^6$ represents an alkylene group, m1 represents an integer of 1 to 20, and m2 represents an integer of 1 to 10.

In the general formulae (2-1) and (2-2), the alkyl group represented by $R^4$ and $R^5$ is preferably an alkyl group having 1 to 6 carbon atoms, more preferably an alkyl group having 1 to 4 carbon atoms. The alkyl group represented by $R^4$ and $R^5$ may be linear, branched or cyclic, but is preferably linear or branched.

In the polyoxyalkyl group $[-(C_xH_{2x}-O)_y-R^{41}]$ represented by $R^4$ and $R^5$ in the general formulae (2-1) and (2-2), the alkyl group represented by $R^{41}$ is preferably an alkyl group having 1 to 6 carbon atoms, and more preferably an alkyl group having 1 to 4 carbon atoms. The alkyl group represented by $R^{41}$ may be linear, branched or cyclic, but is preferably linear or branched.

In the general formula (2-2), the alkylene group represented by $R^6$ is preferably an alkylene group having 1 to 6 carbon atoms, more preferably an alkylene group having 1 to 4 carbon atoms. The alkylene group may be linear, branched or cyclic, but is preferably linear or branched.

In the general formulae (2-1) and (2-2), the group represented by each symbol may be substituted with a substituent. Examples of the substituent include an aryl group, a hydroxyl group, a halogen atom, and the like.

The molecular weight (or weight average molecular weight) of the adipic acid ester is preferably from 200 to 5,000, and more preferably from 300 to 2,000.

Examples of commercially available products of a plasticizer containing an adipic acid ester include Daifatty 101 (containing adipic acid diester, DAIHACHI Chemical Industry Co., Ltd.), Adekacizer RS-107 (containing adipic acid diester, ADEKA Corporation), Polycizer W-230-H (containing adipic acid polyester, DIC Corporation).

[Other Ingredients]

The resin composition according to the exemplary embodiment may contain a resin other than cellulose acetate. Examples of other resins include known thermoplastic resins such as polycarbonate resin; polypropylene resin; polyester resin; polyolefin resin; polyester carbonate resin; polyphenylene ether resin; polyphenylene sulfide resin; polysulfone resin; poly ether sulfone resin; polyarylene resin; polyether imide resin; polyacetal resin; polyvinyl acetal resin; polyketone resin; polyether ketone resin; polyether ether ketone resin; polyaryl ketone resin; polyether nitrile resin; liquid crystal resin; polybenzimidazole resin; polyparabanic acid resin; vinyl-based polymer or copolymer resin obtained by polymerization or copolymerization of one or more vinyl monomers selected from the group consisting of aromatic alkenyl compounds and vinyl cyanide compounds; diene-aromatic alkenyl compound copolymer resin; vinyl cyanide-diene-aromatic alkenyl compound copolymer resin; aromatic alkenyl compound-diene-vinyl cyanide-N-phenylmaleimide copolymer resin; vinyl cyanide-(ethylene-diene-propylene (EPDM))—aromatic alkenyl compound copolymer resin; vinyl chloride resin; and chlorinated vinyl chloride resin. One type of these resins may be used alone, or two or more types may be used in combination. The content of these resins is preferably 0% by mass or more and 5% by mass or less in total with respect to the entire resin composition. Here, "0 mass %" means that these resins are not contained.

The resin composition according to the exemplary embodiment may contain other components other than those described above, as necessary. Examples of the other components include flame retardants, compatibilizers, antioxidants, mold release agents, light stabilizers, weathering agents, colorants, pigments, modifiers, drip inhibitors, antistatic agents, hydrolysis inhibitors, fillers, reinforcing agents (glass fiber, carbon fiber, talc, clay, mica, glass flakes, milled glass, glass beads, crystalline silica, alumina, silicon nitride, aluminum nitride, boron nitride, etc.). The content of these components is preferably 0% by mass or more and 5% by mass or less with respect to the entire resin composition. Here, "0 mass %" means that other components are not contained.

[Method for Producing Resin Composition]

The resin composition according to the exemplary embodiment is produced, for example, by melt-kneading a mixture of cellulose acetate, a low molecular weight (meth) acrylic polymer and a plasticizer. As means for melt-kneading, known means may be mentioned, and specific examples thereof include a twin-screw extruder, a Henschel mixer, a Banbury mixer, a single screw extruder, a multi-screw extruder, a co-kneader and the like. The temperature at the time of kneading may be set according to the melting point of cellulose acetate and is preferably 170° C. or more and 240° C. or less, more preferably 190° C. or more and 220° C. or less, for example, from the viewpoint of suppressing thermal decomposition while melting the material.

<Resin Molded Body>

The resin molded body according to the exemplary embodiment includes the resin composition according to the exemplary embodiment. That is, the resin molded body according to the exemplary embodiment has the same composition as that of the resin composition according to the exemplary embodiment.

The resin molded body according to the exemplary embodiment is obtained by molding the resin composition according to the exemplary embodiment. Examples of molding methods include injection molding, extrusion molding, blow molding, hot press molding, calender molding, coating molding, cast molding, dipping molding, vacuum molding, transfer molding and the like.

From the viewpoint of high degree of freedom of shape, injection molding is preferable for the method for molding a resin molded body according to the exemplary embodiment. In injection molding, a resin composition is heated and melted, poured into a metal mold, and solidified to obtain a molded body. It may be molded by injection compression molding.

In the case of molding the resin molded body according to the exemplary embodiment by injection molding, the cylinder temperature is, for example, 160° C. or more and 260° C. or less, preferably 170° C. or more and 230° C. or less, more preferably 180° C. or more and 200° C. or less. The mold temperature is, for example, 30° C. or more and 120° C. or less, preferably 40° C. or more and 80° C. or less. Injection molding may be carried out using commercially available equipment such as NEX 500, NEX 300, NEX 150, manufactured by NISSEI PLASTIC INDUSTRIAL Co., Ltd., or SE50D manufactured by SUMITOMO MACHINE CORPORATION, for example.

The resin molded body according to the exemplary embodiment is suitably used for applications such as electronic and electrical equipment, office equipment, home appliances, vehicle interior materials, engine covers, car bodies, containers, and the like. More specifically, it includes a casing of an electronic/electric equipment or a home appliances; various parts of an electric/electrical equipment or a home appliances; an interior part of a vehicle; a storage case of a CD-ROM or a DVD and the like; a tableware; a beverage bottle; a food tray; a wrap material; a film; a sheet; and the like.

Example

Hereinafter, embodiments of the present invention will be described in detail by examples, but embodiments of the invention are not limited to these examples. In the following description, all "parts" are on a mass basis unless otherwise specified.
<Preparation of Cellulose Acetate>
[Synthesis of Cellulose Acetate CA1]
(1) Acetylation 3 kg of cellulose powder (KC Flock W50 manufactured by Nippon Paper Chemicals Co., Ltd.), 50 g of sulfuric acid, 30 kg of acetic acid and 6 kg of acetic anhydride are placed in a 50 L reaction vessel and stirred at 20° C. for 4 hours.
(2) Deacetylation and Lowering of Molecular Weight 3 kg of acetic acid and 1.2 L of pure water are immediately added to the reaction solution after completion of the stirring in (1); stirred at 20° C. for 30 minutes; 4.5 kg of 0.2 M hydrochloric acid aqueous solution is added; and heated to 75° C. and stirred for 5 hours. This reaction solution is added dropwise to 200 L of pure water over 2 hours; the solution is allowed to stand for 20 hours; and then filtered through a filter having a pore size of 6 μm to obtain 4 kg of a white powder.
(3) Cleaning The white powder is washed with pure water to a conductivity of 50 μS or less using a filter press (SF (PP) manufactured by Kurita Machinery Co., Ltd.), and then dried.
(4) Postprocessing 200 g of calcium acetate and 30 L of pure water are added to 3 kg of the dried white powder; the mixture is stirred at 25° C. for 2 hours; and then filtered. The obtained powder is dried at 60° C. for 72 hours to obtain about 2.5 kg of cellulose acetate CA1.
[Synthesis of Cellulose Acetate CA2]

Cellulose acetate CA2 is obtained in the same manner as in the synthesis of cellulose acetate CA1 except that the amount of sulfuric acid used in (1) is changed from 50 g to 100 g.
[Synthesis of Cellulose Acetate CA3]

Cellulose acetate CA3 is obtained in the same manner as in the synthesis of cellulose acetate CA1 except that the amount of sulfuric acid used in (1) is changed from 50 g to 10 g.
[Synthesis of Cellulose Acetate CA4]

Cellulose acetate CA4 is obtained in the same manner as in the synthesis of cellulose acetate CA1 except that stirring is carried out for 7 hours in (2) above instead of 5 hours.
[Synthesis of Cellulose Acetate CA5]

Cellulose acetate CA5 is obtained in the same manner as in the synthesis of cellulose acetate CA1, except that stirring is carried out for 4 hours and 30 minutes in (2) above instead of 5 hours.
[Synthesis of Cellulose Acetate CA6]

Cellulose acetate CA6 is obtained in the same manner as in the synthesis of cellulose acetate CA1 except that after the stirring of (1) above, the mixture is allowed to stand at room temperature for 16 hours and then (2) is carried out.

[Synthesis of Cellulose Acetate CA7]

Cellulose acetate CA7 is obtained in the same manner as in the synthesis of cellulose acetate CA1, except that stirring is carried out at 65° C. for 57 hours in (2) above instead of at 75° C. for 5 hours.
[Synthesis of Cellulose Acetate CA8]

Cellulose acetate CA 8 is obtained in the same manner as in the synthesis of cellulose acetate CA1 except that stirring is carried out at 80° C. for 4 hours in (2) above instead of at 75° C. for 5 hours.
[Preparation of Cellulose Acetate CA9]

A commercially available cellulose acetate (L50 manufactured by Daicel Corporation) is prepared as cellulose acetate CA9.
[Preparation of Cellulose Acetate CA10]

A commercially available cellulose acetate (L20 manufactured by Daicel Corporation) is prepared as cellulose acetate CA10.
<Measurement of Acetyl Group Substitution Degree of Cellulose Acetate>

The acetyl group substitution degree of cellulose acetate is determined from the integrated ratio of cellulose-derived peak and acetyl group-derived peak by measuring 1H-NMR spectrum with NMR apparatus (JNM-ECA manufactured by JEOL RESONANCE Inc.).
<Measurement of Weight Average Polymerization Degree of Cellulose Acetate>

The weight average molecular weight (Mw) of the cellulose acetate is measured with a mixed solution of dimethylacetamide and lithium chloride (volume ratio 90:10) as a solvent in a GPC apparatus (HLC-8320 GPC manufactured by Tosoh Corporation, column: TSK gel α-M) to determine the molecular weight as polystyrene conversion.

The molecular weight of the constitutional unit is calculated from the acetyl group substitution degree of cellulose acetate, and the weight average polymerization degree is obtained by dividing the weight average molecular weight (Mw) of cellulose acetate by the molecular weight of the constitutional unit.

Table 1 shows the weight average polymerization degree and acetyl substitution degree of cellulose acetates CA1 to CA10.

TABLE 1

| Cellulose Acetate | Weight Average Polymerization Degree | Acetyl Group Substitution Degree |
| --- | --- | --- |
| CA1 | 300 | 2.25 |
| CA2 | 160 | 2.2 |
| CA3 | 325 | 2.45 |
| CA4 | 130 | 2.15 |
| CA5 | 350 | 2.55 |
| CA6 | 90 | 2.25 |
| CA7 | 320 | 2.65 |
| CA8 | 250 | 2.05 |
| CA9 | 447 | 2.41 |
| CA10 | 417 | 2.45 |

<Preparation of (Meth)Acrylic Polymer>
[Preparation of (Meth)Acrylic Polymer AP1]

Commercially available ARUFON UP 1010 (manufactured by Toagosei Co., Ltd.) is prepared as the (meth)acrylic polymer AP1.
[Preparation of (Meth)Acrylic Polymer AP2]

Commercial ARUFON UP1000 (manufactured by Toagosei Co., Ltd.) is prepared as (meth)acrylic polymer AP2.

[Preparation of (Meth)Acrylic Polymer AP3]

A commercially available METABLEN H-880 (manufactured by Mitsubishi Rayon Co., Ltd.) is prepared as the (meth)acrylic polymer AP3.

[Preparation of (Meth)Acrylic Polymer AP4]

Commercially available DELPOWDER 500V (manufactured by Asahi Kasei Corporation) is prepared as (meth) acrylic polymer AP4.

[Preparation of (Meth)Acrylic Polymer AP5]

Commercially available DELPOWDER 560 F (manufactured by Asahi Kasei Corporation) is prepared as (meth) acrylic polymer AP5.

<Measurement of Weight Average Molecular Weight of (Meth)Acrylic Polymer>

The weight average molecular weight of the (meth)acrylic polymer is measured with tetrahydrofuran as a solvent in a GPC apparatus (HLC-8320 GPC manufactured by Tosoh Corporation, column: TSK gel α-M) to determine the molecular weight as polystyrene conversion.

Table 2 shows the weight average molecular weights of the (meth)acrylic polymers AP1 to AP5.

TABLE 2

| (Meth)Acrylic Polymer | Weight Average Molecular Weight |
|---|---|
| AP1 | 1700 |
| AP2 | 3000 |
| AP3 | 14000 |
| AP4 | 30000 |
| AP5 | 70000 |

<Preparation of Plasticizer>
[Preparation of Plasticizer P1]

A commercially available compound plasticizer containing adipic acid ester (Daifatty 101 manufactured by Daihachi Chemical Industry Co., Ltd.) is prepared as a plasticizer P1.

[Preparation of Plasticizer P2]

A commercially available polyether ester plasticizer (RS-1000, manufactured by ADEKA Corporation) is prepared as a plasticizer P2.

<Preparation of Resin Composition (Pellet)>

Materials are mixed at the charged composition ratio shown in Table 3 and kneaded by a biaxial kneading apparatus (TEX41SS manufactured by Toshiba Machine Co., Ltd.) to obtain pellets (resin composition).

<Injection Molding of Test Specimen>

An ISO multipurpose dumbbell test specimen (measuring part size: width 10 mm, thickness 4 mm) and ISOD2 test specimen (thickness 2 mm) are molded from the obtained pellets using an injection molding machine (NEX140III manufactured by Nissei Plastic Industrial Co., Ltd.) at a cylinder temperature at which the injection peak pressure did not exceed 180 MPa.

<Performance Evaluation Test>
[Melt Viscosity]

Melt viscosity (Pa s) is measured at a barrel temperature of 220° C. and a shear rate of 1216/sec according to JIS K 7199: 1999 using a capillary rheometer (Capilograph 3 D, manufactured by Toyo Seiki Co., Ltd.). The case where the melt viscosity is 300 Pas or less is classified as acceptance (A), and the case where the melt viscosity exceeds 300 Pa·s is classified as failure (NA). The measured values and classification are shown in Table 3. "Unmeasurable" in Table 3 means that the melt viscosity is too high to perform the measurement.

[Tensile Modulus of Elasticity]

Tensile modulus of elasticity (MPa) is measured using an ISO multipurpose dumbbell test specimen in accordance with ISO 527 using a universal testing apparatus (Autograph AG-Xplus, manufactured by Shimadzu Corporation). A case where the tensile elastic modulus is 60 MPa or more is classified as acceptance (A), and a case where the tensile elastic modulus is less than 60 MPa is classified as failure (NA). The measured values and classification are shown in Table 3.

[Bleed Out]

The extent of precipitation (bleed out) of the components in the molded body is evaluated by the load required for peeling off the adhesive tape. When components are precipitated (bleed out), the adhesive tape affixed to the surface of the molded body is likely to be peeled off, and the load required for peeling off the adhesive tape decreases. Even with precipitation (bleed-out) to such an extent that it may not be recognized visually, it may be evaluated by the strength of the load required for peeling off the adhesive tape.

Adhesive tape (YUPOTAC, N YUPO 80/S15, width 10 mm×length 70 mm manufactured by Oji TAC Co., Ltd.) is adhered to the ISOD2 test specimen and allowed to stand in an environment of temperature 65° C./90% relative humidity for 96 hours, then 90° peeling test for peeling off the adhesive tape from the ISOD2 test specimen is performed, and the load at peeling is measured. The 90° peeling test is carried out according to JIS Z 0237: 2009 using a universal testing apparatus (Autograph AG-Xplus, manufactured by Shimadzu Corporation), and under a temperature of 23° C. and a relative humidity of 50% at a load speed of 300 mm/min, and the average of the loads from the start of measurement of 15 mm to 45 mm is obtained. Based on the average value of Example 1, 80% or more is classified as acceptance (A), and less than 80% is classified as failure (NA). Relative values and classification are shown in Table 3.

TABLE 3

| | Composition (parts by mass) | | | | Thermal Fluidity | | Rigidity | | Bleed Out | |
| | | | | | Melt | | Tensile Elastic | | Relative Value of | |
| | Cellulose Acetate | (Meth)Acrylic Polymer | | Plasticizer | Viscosity (Pa · s) | Acceptance | Modulus (Mpa) | Acceptance | Load (%) | Acceptance |
| Comparative Example 1 | CA1 100 | — | 0 | P1 15 | 800 | NA | 80 | A | 95 | A |
| Comparative Example 2 | CA1 100 | AP5 | 7.5 | P1 15 | 1200 | NA | 85 | A | 96 | A |

TABLE 3-continued

| | Composition (parts by mass) | | | | | Thermal Fluidity | | Rigidity | | Bleed Out | |
| --- | --- | --- | --- | --- | --- | --- | --- | --- | --- | --- | --- |
| | Cellulose Acetate | | (Meth)Acrylic Polymer | | Plasticizer | | Melt Viscosity (Pa·s) | Acceptance | Tensile Elastic Modulus (MPa) | Acceptance | Relative Value of Load (%) | Acceptance |
| Comparative Example 3 | CA2 | 100 | — | 0 | P1 | 15 | 770 | NA | 75 | A | 95 | A |
| Comparative Example 4 | CA2 | 100 | AP5 | 7.5 | P1 | 15 | 1150 | NA | 81 | A | 96 | A |
| Comparative Example 5 | CA3 | 100 | — | 0 | P1 | 15 | 780 | NA | 81 | A | 95 | A |
| Comparative Example 6 | CA3 | 100 | AP5 | 7.5 | P1 | 15 | 1150 | NA | 87 | A | 96 | A |
| Comparative Example 7 | CA4 | 100 | — | 0 | P1 | 15 | 730 | NA | 73 | A | 95 | A |
| Comparative Example 8 | CA4 | 100 | AP1 | 7.5 | P1 | 15 | 1100 | NA | 79 | A | 96 | A |
| Example 1 | CA1 | 100 | AP1 | 2 | P1 | 5 | 290 | A | 95 | A | 100 | A |
| Example 2 | CA1 | 100 | AP1 | 2 | P1 | 15 | 260 | A | 80 | A | 97 | A |
| Example 3 | CA1 | 100 | AP1 | 2 | P1 | 20 | 250 | A | 65 | A | 95 | A |
| Example 4 | CA1 | 100 | AP1 | 7.5 | P1 | 5 | 270 | A | 94 | A | 99 | A |
| Example 5 | CA1 | 100 | AP1 | 7.5 | P1 | 15 | 240 | A | 79 | A | 96 | A |
| Example 6 | CA1 | 100 | AP1 | 7.5 | P1 | 20 | 230 | A | 64 | A | 94 | A |
| Example 7 | CA1 | 100 | AP1 | 15 | P1 | 5 | 250 | A | 93 | A | 98 | A |
| Example 8 | CA1 | 100 | AP1 | 15 | P1 | 15 | 220 | A | 78 | A | 95 | A |
| Example 9 | CA1 | 100 | AP1 | 15 | P1 | 20 | 210 | A | 63 | A | 93 | A |
| Example 10 | CA1 | 100 | AP1 | 7.5 | P2 | 15 | 260 | A | 81 | A | 96 | A |
| Example 11 | CA1 | 100 | AP2 | 7.5 | P1 | 15 | 240 | A | 81 | A | 96 | A |
| Example 12 | CA1 | 100 | AP3 | 7.5 | P1 | 15 | 270 | A | 84 | A | 96 | A |
| Example 13 | CA1 | 100 | AP4 | 7.5 | P1 | 15 | 290 | A | 85 | A | 96 | A |
| Example 14 | CA2 | 100 | AP1 | 7.5 | P1 | 15 | 230 | A | 75 | A | 96 | A |
| Example 15 | CA3 | 100 | AP1 | 7.5 | P1 | 15 | 245 | A | 80 | A | 96 | A |
| Example 16 | CA4 | 100 | AP1 | 7.5 | P1 | 15 | 220 | A | 73 | A | 96 | A |
| Comparative Example 9 | CA5 | 100 | AP1 | 7.5 | P1 | 15 | 600 | NA | 80 | A | 96 | A |
| Comparative Example 10 | CA6 | 100 | AP1 | 7.5 | P1 | 15 | 180 | A | 50 | NA | 96 | A |
| Comparative Example 11 | CA7 | 100 | AP1 | 7.5 | P1 | 15 | 550 | NA | 80 | A | 96 | A |
| Comparative Example 12 | CA8 | 100 | AP1 | 7.5 | P1 | 15 | 500 | NA | 65 | A | 96 | A |
| Comparative Example 13 | CA9 | 100 | AP1 | 7.5 | P1 | 15 | Unmeasurable | NA | 82 | A | 96 | A |
| Comparative Example 14 | CA10 | 100 | AP1 | 7.5 | P1 | 15 | Unmeasurable | NA | 81 | A | 96 | A |
| Comparative Example 15 | CA9 | 100 | AP3 | 1.5 | P1 | 25 | 180 | A | 51 | NA | 15 | NA |

As shown by comparison between Comparative Examples 1 and 2 and Examples 1 to 13 containing cellulose acetate CA1, comparison between Comparative Examples 3 to 4 and Example 14 containing cellulose acetate CA2, comparison between Comparative Examples 5 to 6 and Example 15 containing cellulose acetate CA3, and comparison between Comparative Examples 7 to 8 and Example 16 containing cellulose acetate CA4, by adding any one of the (meth)acrylic polymers AP1 to AP4 to the resin composition, a melt viscosity is lowered to 300 Pa·s or less.

As shown in Comparative Examples 2, 4, 6 and 8, the addition of the (meth)acrylic polymer AP5 did not lower the melt viscosity of the resin composition.

In Comparative Example 9 (cellulose acetate CA5:weight average polymerization degree 350) in which the weight average polymerization degree of cellulose acetate exceeds 330, the melt viscosity exceeded 300 Pa·s.

In Comparative Example 10 (cellulose acetate CA6: weight average polymerization degree 90) in which the weight average polymerization degree of cellulose acetate is less than 120, the tensile modulus of elasticity is less than 60 MPa.

In Comparative Example 11 (cellulose acetate CA7:acetyl group substitution degree 2.65) in which the acetyl group substitution degree of cellulose acetate exceeds 2.60, the melt viscosity exceeds 300 Pa·s.

In Comparative Example 12 (cellulose acetate CA8:acetyl group substitution degree 2.05) in which the acetyl group substitution degree of cellulose acetate is less than 2.10, the melt viscosity exceeded 300 Pa·s.

In Comparative Example 13 (cellulose acetate CA9: weight average polymerization degree of 447) and Comparative Example 14 (cellulose acetate CA10:weight average polymerization degree of 417), the melt viscosity is too high to perform the measurement.

In Comparative Example 15 (cellulose acetate CA9: weight average polymerization degree 447), the melt viscosity is 300 Pas or less, but the adhesive tape is easily peeled off. Thermal fluidity is improved by adding 25 parts of Plasticizer P1, but it is presumed that the Plasticizer P1 slightly bled out due to the relatively large amount of Plasticizer P1 added and the adhesive tape is easily peeled off.

While the invention has been described in detail and with reference to exemplary embodiments, it will be apparent to those skilled in the art that various changes and modifications can be made without departing from the spirit and scope of the invention.

What is claimed is:

1. A resin composition comprising:
   a cellulose acetate having a weight average polymerization degree of from 120 to 330 and an acetyl group substitution degree of from 2.10 to 2.60;
   (meth) acrylic polymer having a weight average molecular weight of from 1,000 to 4,000; and
   a plasticizer.
2. The resin composition according to claim 1, containing:
   2 to 15 parts by mass of the (meth)acrylic polymer; and
   5 to 20 parts by mass of the plasticizer,
   with respect to 100 parts by mass of the cellulose acetate.
3. The resin composition according to claim 1, containing:
   3 to 12 parts by mass of the (meth)acrylic polymer with respect to 100 parts by mass of the cellulose acetate.
4. The resin composition according to claim 1, containing:
   5 to 10 parts by mass of the (meth)acrylic polymer with respect to 100 parts by mass of the cellulose acetate.
5. The resin composition according to claim 1, containing:
   8 to 18 parts by mass of the plasticizer with respect to 100 parts by mass of the cellulose acetate.
6. The resin composition according to claim 1, containing:
   10 to 15 parts by mass of the plasticizer with respect to 100 parts by mass of the cellulose acetate.
7. The resin composition according to claim 1,
   wherein the plasticizer includes an adipic acid ester.
8. The resin composition according to claim 7,
   wherein the adipic acid ester is selected from a group consisting of: an adipic acid diester represented by the following general formula (2-1); and an adipic acid polyester represented by the following general formula (2-2), General formula (2-1)

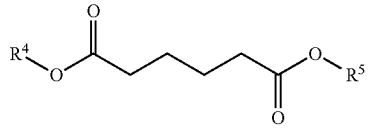

General formula (2-2)

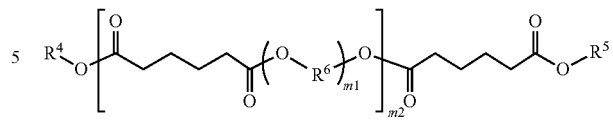

wherein, in the general formulae (2-1) and (2-2),
$R^4$ and $R^5$ independently represent an alkyl group or a polyoxyalkyl group $[-(C_xH_{2x}-O)_y-R^{41}]$, wherein $R^{41}$ represents an alkyl group, x represents an integer of 1 to 10, and y represents an integer of 1 to 10,
in the general formula (2-2), $R^6$ represents an alkylene group, m1 represents an integer of 1 to 20, and m2 represents an integer of 1 to 10.

9. The resin composition according to claim 8,
   wherein the alkyl group represented by $R^4$ and $R^5$ respectively have 1 to 6 carbon atoms.
10. The resin composition according to claim 8,
    wherein the alkyl group represented by $R^4$ and $R^5$ are respectively linear, branched or cyclic.
11. The resin composition according to claim 8,
    wherein the alkyl group represented by $R^{41}$ has 1 to 6 carbon atoms.
12. The resin composition according to claim 8,
    wherein the alkyl group represented by $R^{41}$ is linear, branched or cyclic.
13. The resin composition according to claim 8,
    wherein the alkylene group represented by $R^6$ has 1 to 6 carbon atoms.
14. The resin composition according to claim 7,
    wherein the adipic acid ester has a molecular weight of from 200 to 5,000.
15. The resin composition according to claim 1,
    wherein the acetyl group substitution degree of the cellulose acetate is from 2.15 to 2.45.
16. A resin molded body comprising the resin composition according to claim 1.
17. The resin molded body according to claim 16, that is an injection molded body.

* * * * *